US008687063B2

(12) United States Patent
Hsieh et al.

(10) Patent No.: US 8,687,063 B2
(45) Date of Patent: Apr. 1, 2014

(54) METHOD FOR PREDICTING LANE LINE AND LANE DEPARTURE WARNING SYSTEM USING THE SAME

(75) Inventors: Hsi-Wen Hsieh, Taoyuan County (TW); Yung-Sheng Liao, Taipei County (TW); Che-Chung Lin, Hsinchu (TW); Chi-Wei Lin, Taipei County (TW); Dau-Chen Huang, Taichung County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 1096 days.

(21) Appl. No.: 12/019,936

(22) Filed: Jan. 25, 2008

(65) Prior Publication Data

US 2009/0058622 A1    Mar. 5, 2009

(30) Foreign Application Priority Data

Aug. 30, 2007    (TW) ................. 96132182 A

(51) Int. Cl.
*H04N 7/18*    (2006.01)
*H04N 7/00*    (2011.01)

(52) U.S. Cl.
USPC ........... 348/148; 348/113; 348/114; 348/115; 348/118; 348/119

(58) Field of Classification Search
USPC ........................................................ 348/148
See application file for complete search history.

(56) References Cited

U.S. PATENT DOCUMENTS

| | | | | |
|---|---|---|---|---|
| 5,406,324 A * | 4/1995 | Roth | ................................ | 348/22 |
| 5,555,555 A * | 9/1996 | Sato et al. | ..................... | 382/104 |
| 5,621,645 A * | 4/1997 | Brady | ............................ | 701/117 |
| 5,642,093 A * | 6/1997 | Kinoshita et al. | ............. | 340/439 |
| 5,892,855 A * | 4/1999 | Kakinami et al. | ............. | 382/291 |
| 6,163,022 A * | 12/2000 | Yasui et al. | ................. | 250/208.1 |
| 6,493,458 B2 * | 12/2002 | Yasui et al. | ................... | 382/104 |
| 6,525,653 B1 * | 2/2003 | Rigmaiden | ................ | 340/426.1 |
| 6,813,370 B1 * | 11/2004 | Arai | ............................... | 382/104 |
| 6,819,779 B1 * | 11/2004 | Nichani | ........................ | 382/104 |
| 6,831,556 B1 * | 12/2004 | Boykin | ........................ | 340/539.1 |
| 7,085,633 B2 * | 8/2006 | Nishira et al. | ................... | 701/36 |
| 7,095,432 B2 * | 8/2006 | Nakayama et al. | ........... | 348/148 |
| 7,131,136 B2 * | 10/2006 | Monroe | ........................ | 725/105 |

(Continued)

FOREIGN PATENT DOCUMENTS

| | | |
|---|---|---|
| JP | 2004-310522 A | 11/2004 |
| TW | I228086 | 2/2005 |
| TW | I270827 | 1/2007 |
| TW | I294846 | 8/2007 |

*Primary Examiner* — Rupal Dharia
*Assistant Examiner* — Marcus McKenzie
(74) *Attorney, Agent, or Firm* — WPAT, PC; Justin King

(57) ABSTRACT

A method for predicting lane line is provided in the present invention, in which the method is capable of predicting and reconstructing the unidentified lane line according to a predetermined geometry relationship based on the recognized lane line data previously while one side of lane line is unable to be identified. In one embodiment, a lane predicting relationship formula is formed by describing the geometry relationship between the two identified lines defined the lane. When the one side of line of the lane is unable to be identified, a new predicted line can be reconstructed for representing the unidentified line of lane according to the lane predicting relationship curve. In another embodiment, a lane departure warning system utilizing the foregoing method is provided for monitoring vehicle moving status and alerting the driver so as to enhance the vehicle safety.

17 Claims, 7 Drawing Sheets

(56) References Cited

U.S. PATENT DOCUMENTS

| | | | |
|---|---|---|---|
| 7,188,014 B1* | 3/2007 | Liao et al. | 701/49 |
| 7,228,212 B2* | 6/2007 | Hijikata et al. | 701/45 |
| 7,684,945 B2* | 3/2010 | Walter et al. | 702/96 |
| 2002/0095246 A1* | 7/2002 | Kawazoe | 701/1 |
| 2003/0016287 A1* | 1/2003 | Nakayama et al. | 348/148 |
| 2003/0069695 A1* | 4/2003 | Imanishi et al. | 701/301 |
| 2003/0081122 A1* | 5/2003 | Kirmuss | 348/148 |
| 2004/0113770 A1* | 6/2004 | Falk et al. | 340/531 |
| 2005/0187684 A1* | 8/2005 | Hijikata et al. | 701/45 |
| 2006/0095199 A1* | 5/2006 | Lagassey | 701/117 |
| 2006/0103513 A1* | 5/2006 | Ihara et al. | 340/435 |
| 2006/0239509 A1* | 10/2006 | Saito | 382/104 |
| 2006/0274829 A1* | 12/2006 | Siemens et al. | 375/240.01 |
| 2007/0273554 A1* | 11/2007 | Sakakibara | 340/932.2 |
| 2008/0079607 A1* | 4/2008 | Uemura | 340/932.2 |
| 2008/0143509 A1* | 6/2008 | Wang et al. | 340/471 |
| 2009/0051516 A1* | 2/2009 | Abel et al. | 340/436 |
| 2009/0167560 A1* | 7/2009 | Becker | 340/903 |
| 2009/0284597 A1* | 11/2009 | Nakamori et al. | 348/148 |

\* cited by examiner

METHOD FOR PREDICTING LANE LINE AND LANE DEPARTURE WARNING SYSTEM USING THE SAME

FIELD OF THE INVENTION

The present invention relates to a lane recognition and warning system, and more particularly, to a method for predicting lane line capable of functioning in a condition that only one line out of the two lines defining a lane is recognizable as it is capable of compensating and reconstructing the unidentified lane line in real time.

BACKGROUND OF THE INVENTION

With rapid advance of technology and economy, almost every family is able to afford a mobile vehicle for convenience. However, with the prevalence of automobiles, the death toll from fatal traffic accidents is increasing. According to the statistics provided by the Department of Statistics, Ministry of Transportation and Communications, Republic of China, such death toll per year is about 3000 persons, and there is about two hundred thousand wounded. Just in Year 2005, there are 2,894 deaths and 200,009 wounded, that there is on average 8 deaths per day.

It is common knowledge that a driver must maintain focused on driving at all time so as to prevent any accident from happening. However, studies show that the drivers' attentions are easily being diverted. Therefore, many intelligent driving assistance systems with advanced machine vision recognition technology are being developed which are able to enhance driving safety by constantly and persistently recognizing and tracking lane lines of the road on which a vehicle is running. Nevertheless, the lane recognition using such intelligent driving assistance systems can be erroneous since it may be affected by the ambient environment where it is working in, such as unidentifiable lane lines, or evenly by other noise signals on the road.

One such prior-art is a road line recognition apparatus, disclosed in U.S. Pub. No. 20060239509, which uses an imaging processing unit to analyze images of a progress path in the front of the vehicle so as to precisely detect a road line on which the vehicle travels. However, the aforesaid apparatus is unable to cope with the condition that only one line out of the two lines defining a lane is recognizable.

Therefore, it is in need of a method for predicting lane line and lane departure warning system using the same that are capable of compensating and reconstructing the unidentified lane line in real time when there is only one line out of the two lines defining a lane is recognizable.

SUMMARY OF THE INVENTION

The object of the present invention is to provide a method for predicting lane line, adapted for roads of any lane width, that is capable of compensating and reconstructing the unidentified lane line in real time when there is only one line out of the two lines defining a lane is recognizable, by which, an accurate lane information freed from the affection of the ambient environment is provided to a driver as driving assistance.

Another object of the invention is to provide a lane departure warning system which is capable of automatically detecting lane departures of a vehicle and thus issuing a alarm to alert the driver of the vehicle.

One another object of the invention is to provide a method for predicting lane line, which is capable of dynamically updating a lane predicting relationship curve according to any new lane line information conceived by the method.

To achieve the above objects, the present invention provides a method for predicting lane line, comprising the steps of: providing two lane predicting relationship curves; imaging lane lines of a lane and measuring a characteristic value of an identifiable lane line of the lane lines when there is only one lane line of the imaged lane lines that is identifiable; and reconstructing an unidentifiable lane line to complete the lane image by applying the measured characteristic value into the two lane predicting relationship curves.

In an exemplary embodiment, the present invention provides a lane departure warning system, comprising: at least a front imaging unit, for imaging an image of lane lines of a lane on which a vehicle travels; a vehicle status detecting unit, for detecting a status of the vehicle and thus generating a detection signal; an image processing/controlling module, capable of performing an operation based upon the image of lane line and the detection signal so as to generate an alarm signal; a displaying unit, coupled to the image processing/controlling module for receiving signals from the image processing/controlling module and thus displaying an image of lane line according; and an alerting unit, coupled to the image processing/controlling module for receiving the alarm signal and thus generating an alarm; wherein the image processing/controlling module is configured to reconstruct an unidentifiable lane line to complete the lane image when there is only one lane line of the lane line image that is identifiable.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
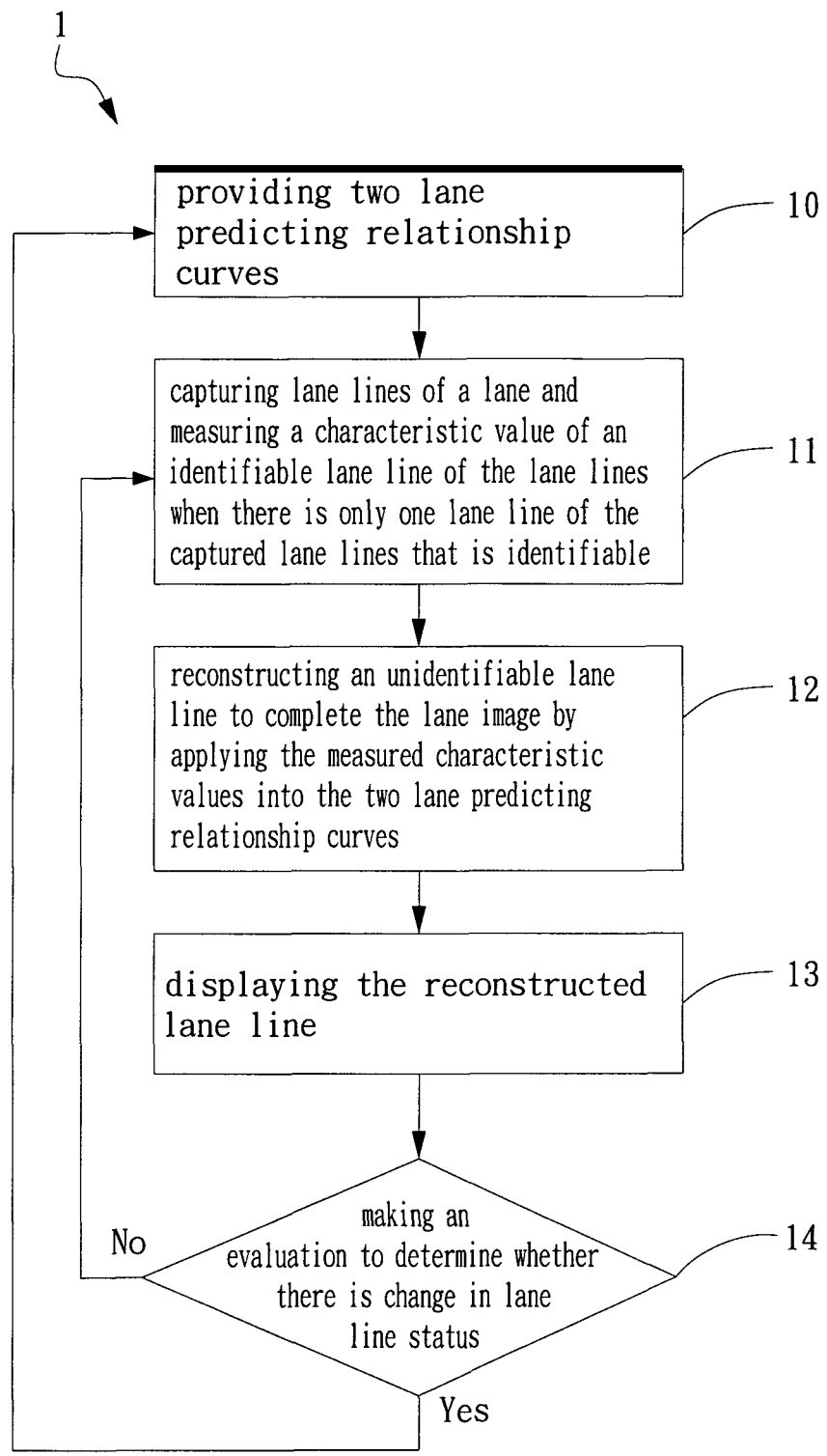
FIG. 1 is a flow chart depicting steps of a method for predicting lane line according to the present invention.

Please refer to FIG. 1, which is a flow chart depicting steps of a method for predicting lane line according to the present invention. As shown in FIG. 1, the flow starts at step 10. At step 10, two lane predicting relationship curves are provided, and then the flow proceeds to step 11. In this exemplary embodiment each lane predicting relationship curve is generated by a numerical analysis means, but is not limited thereby. Please refer to FIG. 2A, which is a flow chart depicting steps for generating the lane predicting relationship curves used in the lane line predicting method according to an exemplary embodiment of the invention. In the embodiment shown in FIG. 2A for generating lane predicting relationship curves, the flow starts at step 101. At step 101, a plurality of lane line images of a lane are provided, and then the flow proceeds to step 102. It is noted that the plural lane line images can be acquired by the use of an imaging unit arranged at the front of a vehicle, and the imaging device can be a charge-coupled device (CCD), or a complementary metal-oxide semiconductor (CMOS). Moreover, such imaging unit can be mounted on the vehicle at any location dependent only on actual needs, and the proceeding of the flow chart of FIG. 2 can be performed when the vehicle is motionless or stopped, or can be performed when the vehicle is moving along a lane.

Figure 2A:
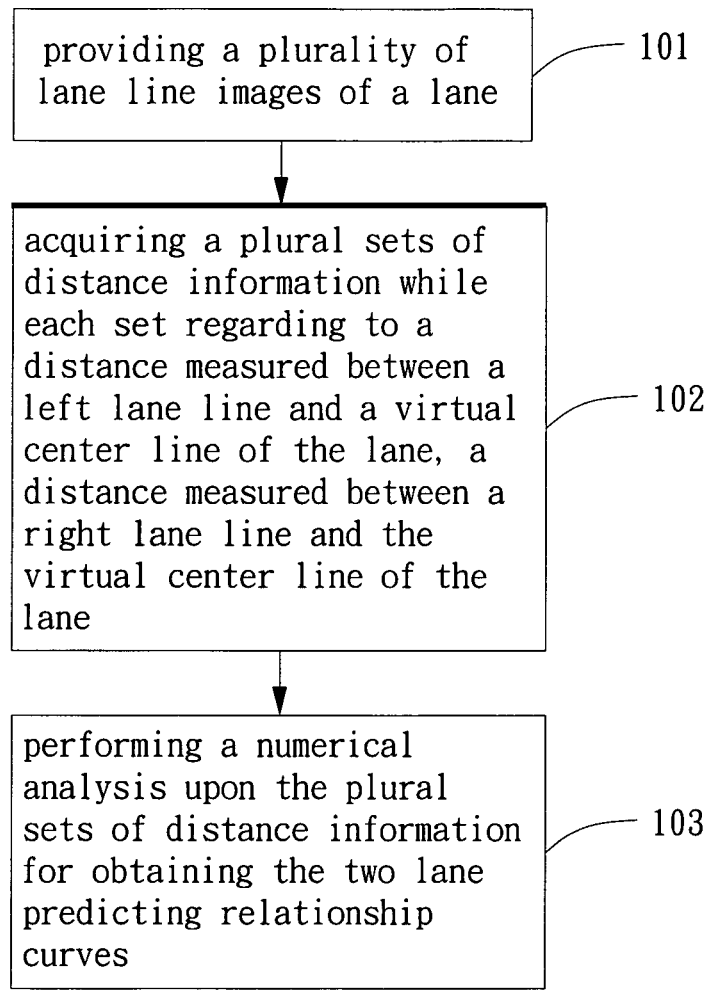
FIG. 2A is a flow chart depicting steps for generating the lane predicting relationship curves used in the lane line predicting method according to an exemplary embodiment of the invention.
Figure 2C:
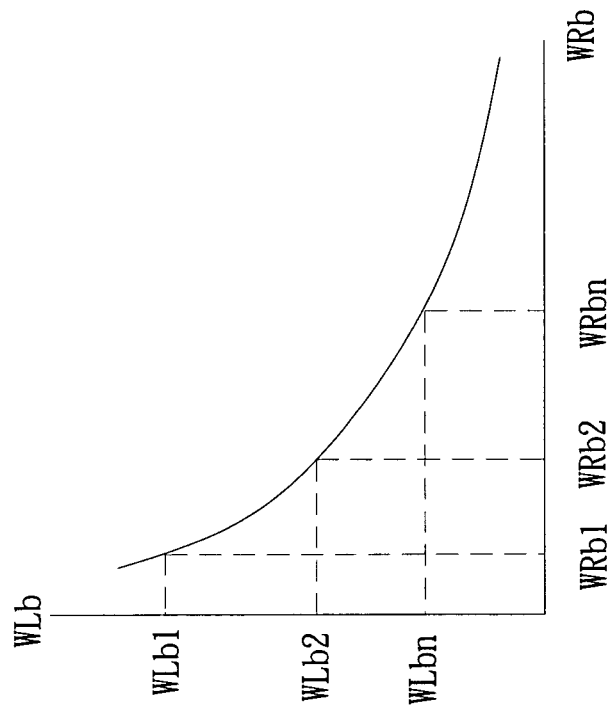
FIG. 2B and FIG. 2C are schematic diagrams showing lane predicting relationship curves of the invention.
Figure 2B:
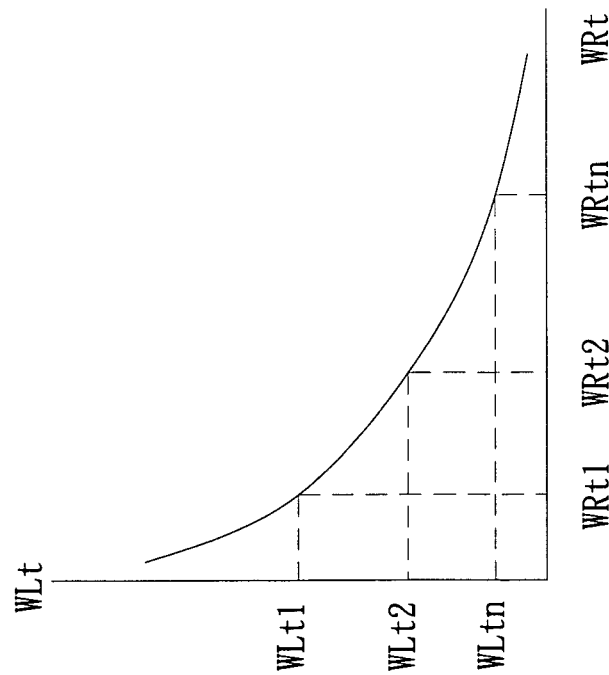
Figures 4A, 4B:
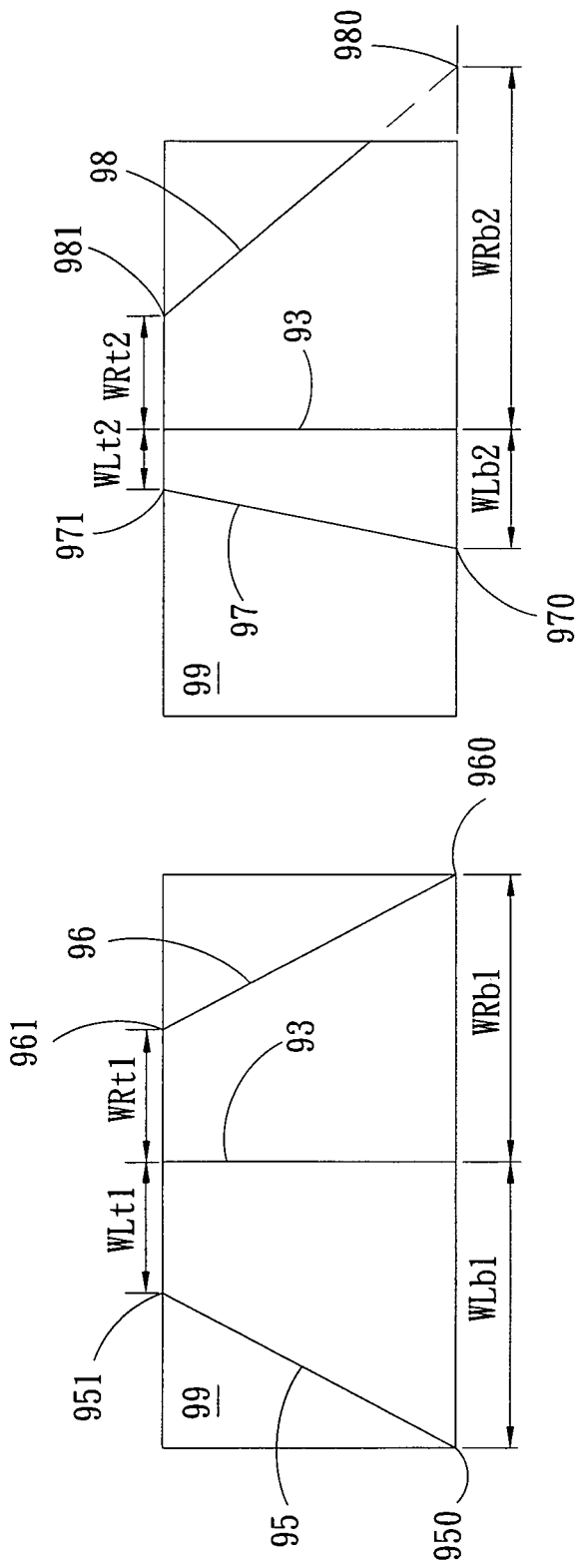
FIG. 4A and FIG. 4B describe relationships of distances in a lane measured between lane lines and its virtual center line.

After the plural lane line images, being different from each other, are acquired, the flow of FIG. 2A proceeds to step 102. At step 102, characteristic values of the lane are measured and obtained from the plural lane line images in respective. In this exemplary embodiment, each characteristic value is measured at the intersection of the lane and a region of interest (ROI) fetched from a corresponding lane line image, but it is not limited thereby. The so-called ROI is the area in the lane line image that is selected for image processing and evaluation. As for the end of lane line can be described using the two lane line images shown in FIG. 4A and FIG. 4B. In FIG. 4A, two sets of distance information, i.e. (WLb1, WRb1) and (WLt1, WRt1), are obtained from the ROI 99, in which (WLb1, WRb1) respectively represent the distances between the bottom ends 950, 960 of the lane lines 95, 96 and the virtual center line 93 of the lane; and (WLt1, WRt1) respectively represent the distances between the top ends 951, 961 of the lane lines 95, 96 and the virtual center line 93 of the lane.

Moreover, In FIG. 4B, two sets of distance information, i.e. (WLb2, WRb2) and (WLt2, WRt2), are obtained from the ROI 99, in which (WLb2, WRb2) respectively represent the distances between the bottom ends 970, 980 of the lane lines 97, 98 and the virtual center line 93 of the lane; and (WLt2, WRt2) respectively represent the distances between the top ends 971, 981 of the lane lines 97, 98 and the virtual center line 93 of the lane. In FIG. 4A and FIG. 4B, there are two distance sets relating to the top end which are (WL11, WRt1) and (WLt2, WRt2), and also there are two distance sets relating to the bottom end which are (WLb1, WRb1) and (WLb2, WRb2). After step 102 is completed, the flow proceeds to step 103. At step 103, a numerical analysis is performed respectively upon the distance sets relating to the top end and the distance sets relating to the bottom end so as to obtain a top and a bottom lane predicting relationship curves in respective.

Nevertheless, each of such curves can be described by a formula, which can be a first-order, a second-order, or even nth-order formula. It is known that for solving an nth-order formula, there must be at least n+1 images available. For instance, if there are m images and m>n+1, the nth-order formula can be solved by the least square method, but is not limited thereby. However, in actual application, in order to be able to describe the geometry relationship between the two lane lines precisely, it is usually acquired m images which m>>n+1. Observing those total squared distances obtaining by applying the least square method upon those formulas, the smallest of which is the most appropriate formula for describing the geometry relationship between the two lane lines, which also represents that the internal parameters of the formula are obtained at the same time. Please refer to FIG. 2A and FIG. 2B, which are schematic diagrams showing lane predicting relationship curves of the invention. It is noted that the types of the top and the bottom lane predicting relationship curves are not necessary to be the same.

Figure 3:
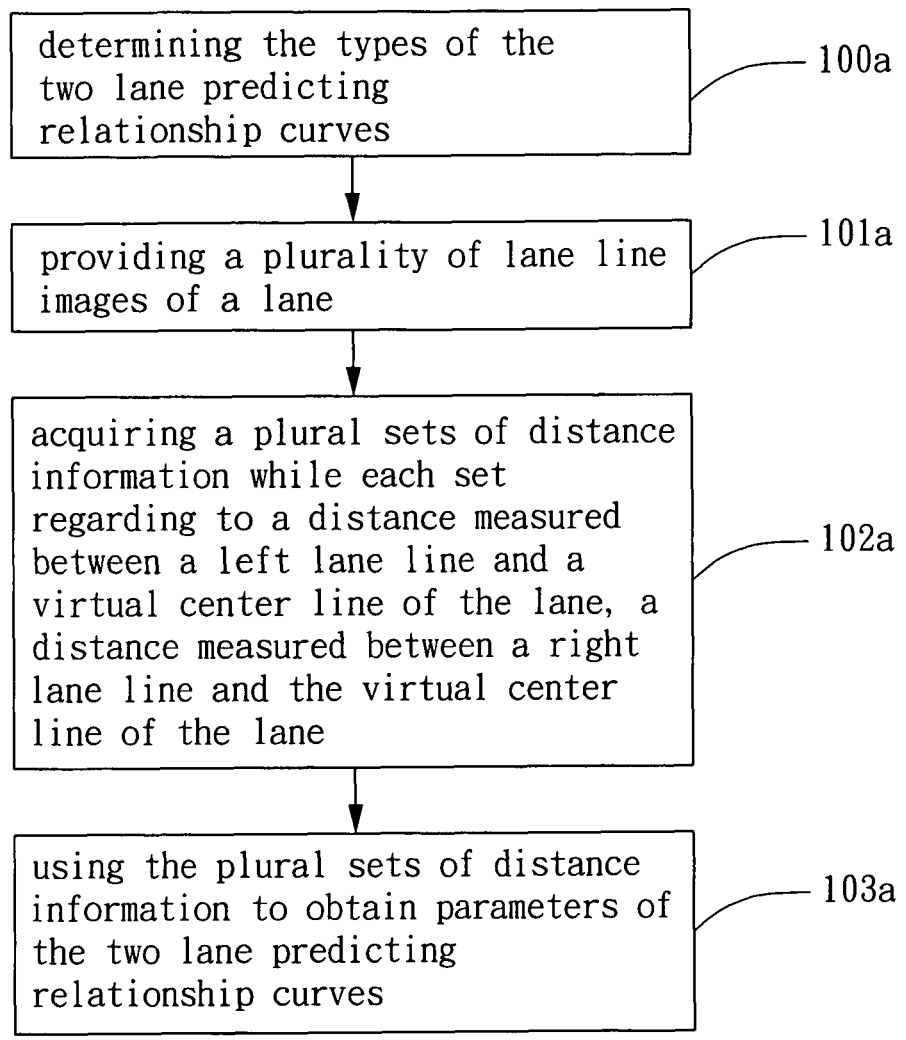
FIG. 3 is a flow chart depicting steps for generating the lane predicting relationship curves used in the lane line predicting method according to another exemplary embodiment of the invention.

Please refer to FIG. 3, which is a flow chart depicting steps for generating the lane predicting relationship curves used in the lane line predicting method according to another exemplary embodiment of the invention. In the embodiment shown in FIG. 3 for generating lane predicting relationship curves, the flow starts at step 100a. At step 100a, the types of the top and bottom lane predicting relationship curves are determined, and then the flow proceeds to step 102. There are two ways for determining the types of the two lane predicting relationship curves, one of which is described in FIG. 2A, and another one is based upon simplicity for choosing the experimental result of numerical analysis for determining the types. Any of the two ways is capable of determining the types of the lane predicting relationship curves, and is selected based on the precision requirement of the lane line reconstruction. Since one of the two ways is already described in the forgoing description, the use of the other way, that is, the types of lane predicting relationship curves are provided by numerical analysis experiment, is provided in the following. Assuming the top and the bottom lane predicting relationship curves are represented by the two formulas listed in the following:

$$WLt=(a1/WRt)+b1 \quad (1)$$

$$WLb=(a2/WRb)+b2 \quad (2)$$

After step 100a is completed, the flow proceeds to step 101a. At step 101a, a plurality of lane line images of a lane are provided, and then the flow proceeds to step 102a. At step 102a, a plural sets of distance information are acquired in which while each set is regarding to a distance measured between a left lane line and a virtual center line of the lane, a distance measured between a right lane line and the virtual center line of the lane. Take the embodiments shown in FIG. 4A and FIG. 4B for example, there are two distance sets relating to the top end and also there are two distance sets relating to the bottom end which can be used for solving the aforesaid formulas (1) and (2) for obtaining parameters, i.e. a1, b1, a2 and b2. However, if the lane predicting relationship curves are represented by an nth-order formulas, it will require at least n+1 distance sets for solving such nth-order formula, and if there are m images and m>n+1, the nth-order formula can be solved by the least square method, but is not limited thereby. Similarly, in actual application, in order to be able to describe the geometry relationship between the two lane lines precisely, it is usually acquired m images which m>>n+1.

Figure 5B:
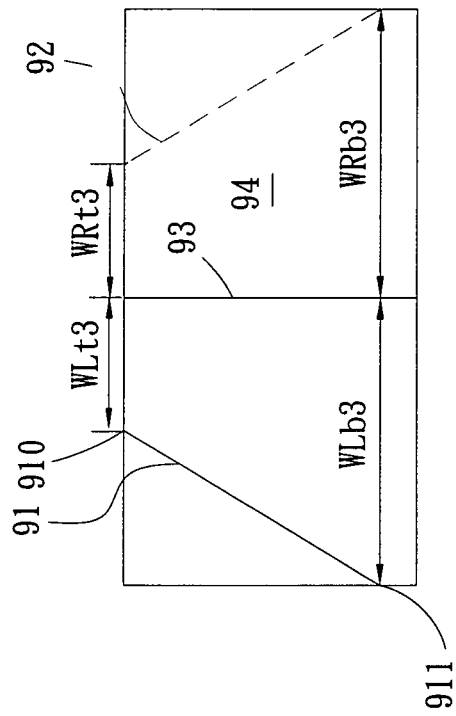
FIG. 5A and FIG. 5B are schematic diagrams showing the reconstructing of an unidentifiable lane line according to the present invention.
Figure 5A:
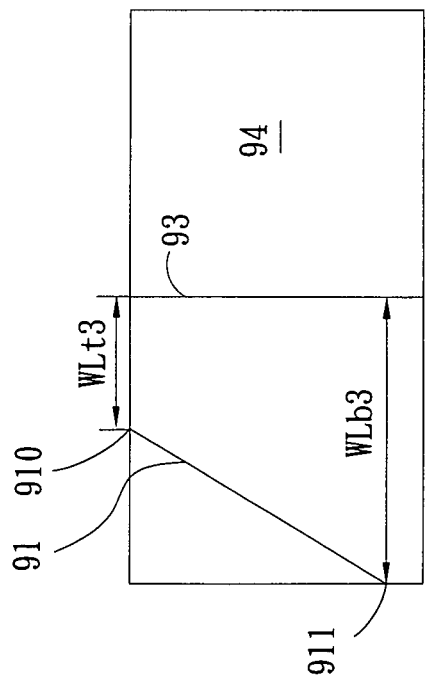

Please now referring back to FIG. 1, the step 11 is proceeded after step 10 completes. At step 11, lane lines of a lane are imaged while a vehicle is moving so as to perform a lane line recognition process. As shown in FIG. 5A, where there is only the left lane line 91 is identifiable in the acquired lane line images, that is, there is only one lane line of the imaged lane lines that is identifiable, characteristic values of an left lane line 91 are measured using the ROI of the acquired lane line images, which are, in this exemplary embodiment, WLb3 and WLt3, respectively being the distances between the top and the bottom ends 910, 911 of the lane line 91 and the virtual center line 93 of the lane. At step 12. the right lane line, which is unidentifiable, can be reconstructed to complete the lane line image by applying the measured characteristic values into the two lane predicting relationship curves, so that lane line image with the reconstructed lane line 92 is predicted as that shown in FIG. 5.

Taking the aforesaid formulas (1) and (2) for example, as the parameters a1, b1, a2, and b2 are known, thus, as soon as WLb3 and WLt3 are measured and applying to the formulas (1) and (2), the WRb3 and WRt3 can be solved so as to reconstructed the unidentifiable right lane line. After the step 12 is completed, the step 13 is proceeded. At step 13, the reconstructed lane line 92 is displayed for achieving an image with complete lane lines; and then the flow proceeds to step 14. At step 14, an evaluation is made to determine whether there is change in lane line status. It is noted that different lane line status are described by different lane predicting relationship curve, and in this exemplary embodiment, the lane line status is defined as the width of the lane. Therefore, if it is detected in step 14 that the lane line status is changed, the flow is proceeded back to step 10 for updating lane predicting relationship curves; otherwise the flow proceeds to step 11. It is noted that the updating of the lane predicting relationship curves can be performed using the steps described in FIG. 2A or FIG. 3 and thus is not described further herein.

Figure 6:
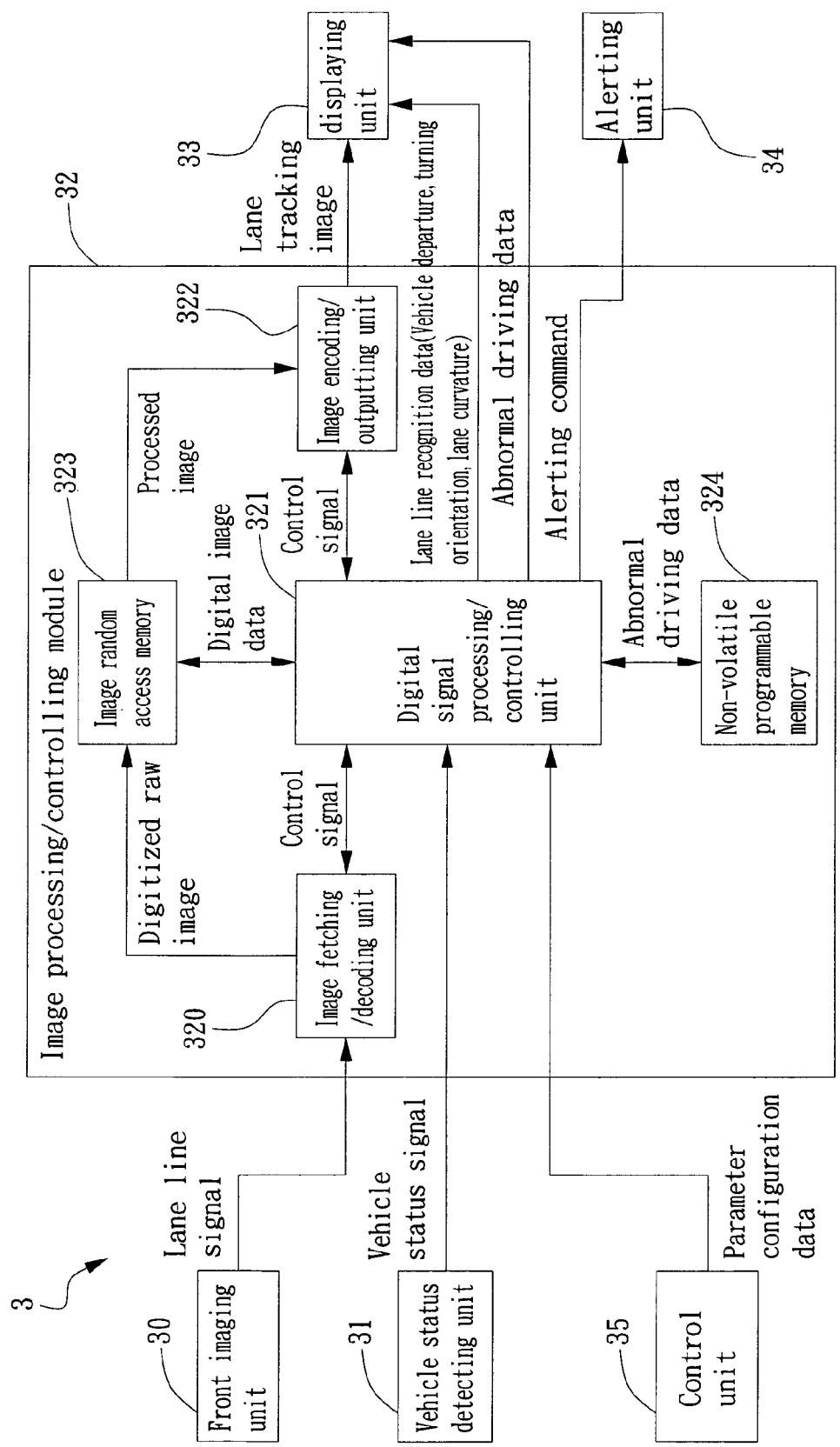
FIG. 6 is a block diagram showing a lane departure warning system according to an exemplary embodiment of the invention.

Please refer to FIG. 6, which is a block diagram showing a lane departure warning system according to an exemplary embodiment of the invention. In FIG. 6, the lane departure warning system 3 comprises: at least a front imaging unit 30; a vehicle status detecting unit 31; an image processing/controlling module 32; a displaying unit 33; and an alerting unit 34. The at least one front imaging unit 30 is used for imaging an image of lane lines of a lane on which a vehicle travels, which can be a camcorder or an infrared imaging device. In addition, the camcorder can be a CCD or CMOS.

The vehicle status detecting unit 31 is used for detecting a status of the vehicle and thus generating a detection signal. In this exemplary embodiment, the vehicle status detecting unit 31 can detect vehicle information relating to a measurement, such as speed, brake signal, turning signal and the combination thereof, and then transmit the detected information to the image processing/controlling module 32 where it is used in logistic evaluation for safety precaution. It is known for those skilled in the art that how to use sensor for detecting vehicle statuses, and thus are not described further herein. The image processing/controlling module 32 is capable of performing an operation based upon the image of lane line and the detection signal so as to generate an alarm signal. In addition, the image processing/controlling module 32 is adapted for executing the steps shown in FIG. 1. That is, when there is only one lane line of the imaged lane lines that is identifiable, the image processing/controlling module 32 is able to predict and reconstruct the unidentifiable lane line by the use of the aforesaid lane predicting relationship curves.

Moreover, the image processing/controlling module 32 further comprises: an image fetching/decoding unit 320; a digital signal processing/controlling unit 321; and an image encoding/outputting unit 322. The image fetching/decoding unit 320 is coupled to the front imaging unit 30 for converting the lane line image into a digital image data. The digital signal processing/controlling unit 321 is used for analyzing the digital image data received from the image fetching/decoding unit 320. The image encoding/outputting unit 322 is coupled to the digital signal processing/controlling unit 321 and the displaying unit 33 for enabling the same to receive a control signal from the digital signal processing/controlling unit 322 while using the control signal for image encoding and thus outputting an output image data to the displaying unit 33.

In addition, the mage processing/controlling module 32 further comprises: an image random access memory 323 and a non-volatile programmable memory 324. The image random access memory 323 is used for storing the digital image data and a processed image data, being the image data processed and outputted from the digital signal processing/controlling unit 321, in a manner that it is used for providing the digital image data to the digital signal processing/controlling unit 321 and the process image data to the image encoding/outputting unit 322. The non-volatile programmable memory 324 is used for registering the analysis result of lane line information received from the digital signal processing/controlling unit 321.

The displaying unit 33 is coupled to the image processing/controlling module 32 for receiving signals from the image processing/controlling module 32 and thus displaying an image of lane line according. The digital signal processing/controlling unit 321 is further configured to transmit a lane line recognition data and an abnormal driving data to the displaying unit 33; in which the lane line recognition data includes data of vehicle departure, turning orientation and lane curvature. The alerting unit 34 is coupled to the image processing/controlling module 32 for receiving the alarm signal and thus generating an alarm. In an exemplary embodiment, the alarm generated by the alerting unit for alerting is a response selected from the group consisting of a sound, a light, a vibration. Furthermore, the lane departure warning system further comprises a control unit 35, provided to be used by a user as a control interface for disarming the alarm and adjusting system parameters, by which the user can activate safety alarm, set vehicle departure allowable, set threshold values regarding to lane curvature and speed limit. It is noted that all the parameters adjusted and configured by the user are being sent to the image processing/controlling module to be used for determining whether the vehicle is departing from the lane or is negotiating a turn while speeding, and so on.

To sum up, the present invention provides a method for predicting lane line and a lane departure warning system that are able to issue a warning while the vehicle is departing from the lane on while it travels by predicting and reconstructing an identifiable lane line at all time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for reconstructing an unidentified boundary of a traffic lane including a left boundary and right boundary, comprising the steps of:

capturing a plurality of traffic lane images by a front imaging unit;

providing a top boundary predicting relationship curve and a bottom boundary predicting relationship curve by a control unit, wherein the top boundary predicting relationship curve defines a top geometric relationship between the left boundary and the right boundary at top of a region of interest (ROI) in a traffic lane image, and the bottom boundary predicting relationship curve defines a bottom geometric relationship between the left boundary and the right boundary at bottom of the ROI in the traffic lane image, and the top boundary predicting relationship curve and the bottom boundary predicting relationship curve are determined by a determining process comprising the steps of:

identifying the left boundary and the right boundary of the traffic lane in the plurality of traffic lane images, and setting a virtual center line for the traffic lane;

forming the ROI in each traffic lane image, wherein each ROI in each traffic lane image comprises:
        a top left point, wherein the top left point is where the left boundary intercepts top of the ROI;
        a top right point, wherein the top right point is where the right boundary intercepts top of the ROI;
        a bottom left point, wherein the bottom left point is where the left boundary intercepts bottom of the ROI; and
        a bottom right point, wherein the bottom right point is where the right boundary intercepts bottom of the ROI;

acquiring a plurality of distance information sets by acquiring each distance information set from each of the traffic lane images, wherein each distance information set comprises:
        a top left distance measured between the top left point and the virtual center line;
        a top right distance measured between the top right point and the virtual center line;
        a bottom left distance measured between the bottom left point and the virtual center line of the lane; and
        a bottom right distance measured between the bottom right point and the virtual center line; and performing a numerical analysis upon the plurality of distance information sets as a first set of characteristic values and a second set of characteristic values to obtain the top boundary predicting relationship curve and the bottom boundary predicting relationship curve;

reconstructing the unidentifiable boundary in any traffic lane image by applying the measured first and second set of characteristic values into the top boundary predicting relationship curve and the bottom boundary predicting relationship curve, by the control unit;

dynamically updating the top boundary predicting relationship curve and the bottom boundary predicting relationship curve when width of the lane is changed by repeating the determining process to update the top boundary predicting relationship curve and the bottom boundary predicting relationship curve;

detecting a vehicle status by a vehicle status detecting unit, and forwarding the vehicle status to control unit;

issuing an alarm signal by the control unit as the control unit evaluates the vehicle status and determine a precaution is needed; and generating an alarm by an alerting unit, wherein the alerting unit is coupled to the control unit for receiving the alarm signal to generate the alarm.

2. The method of claim 1, wherein the first set of characteristic values includes the top left distance and the top right distance.

3. The method of claim 1, wherein the obtaining the top boundary predicting relationship curve and the bottom boundary predicting relationship curve further comprises:
    determining types of the top boundary predicting relationship curve and the bottom boundary predicting relationship curve;
    imaging at least two traffic lane images each with an identifiable left boundary and an identifiable right boundary; and
    acquiring two consecutive distance information sets.

4. The method of claim 1, further comprises displaying the reconstructed unidentifiable boundary.

5. The method of claim 1, wherein the dynamically updating the top boundary predicting relationship curve and the bottom boundary predicting relationship curve further comprises
    updating the distance information sets from a plurality of newly fetched traffic lane images.

6. A traffic lane departure warning system, comprising:
    a front imaging unit, for capturing a plurality of traffic lane images of a traffic lane on which a vehicle travels on the traffic lane, wherein the traffic lane has a left boundary and a right boundary;
    a vehicle status detecting unit, for detecting a status of the vehicle and thus generating a status signal;
    an image processing/controlling module, reconstructing an identifiable boundary of the traffic lane and evaluating the status signal so as to generate an alarm signal;
    a displaying unit, coupled to the image processing/controlling module for displaying an image of lane line according; and
    an alerting unit, coupled to the image processing/controlling module for receiving the alarm signal and thus generating an alarm;
    wherein the image processing/controlling module reconstructs the identifiable boundary by:
        identifying the left boundary and the right boundary of the traffic lane in the plurality of traffic lane images, and setting a virtual center line for the traffic lane;
        forming the ROI in each traffic lane image, wherein each ROI in each traffic lane image comprises:
            a top left point, wherein the top left point is where the left boundary intercepts top of the ROI;
            a top right point, wherein the top right point is where the right boundary intercepts top of the ROI;
            a bottom left point, wherein the bottom left point is where the left boundary intercepts bottom of the ROI; and
            a bottom right point, wherein the bottom right point is where the right boundary intercepts bottom of the ROI;
        acquiring a plurality of distance information sets by acquiring each distance information set from each of the traffic lane images, wherein each distance information set comprises:
            a top left distance measured between the top left point and the virtual center line;
            a top right distance measured between the top right point and the virtual center line;
            a bottom left distance measured between the bottom left point and the virtual center line of the lane; and
            a bottom right distance measured between the bottom right point and the virtual center line; and
        performing a numerical analysis upon the plurality of distance information sets as a first set of characteristic values and a second set of characteristic values to obtain the top boundary predicting relationship curve and the bottom boundary predicting relationship curve.

7. The system of claim 6, wherein the front imaging unit is a camcorder.

8. The system of claim 7, wherein the camcorder is a device selected from the group consisting of a charge-coupled device (CCD), and a complementary metal-oxide semiconductor (CMOS).

9. The system of claim 6, wherein the front imaging unit is an infrared imaging unit.

10. The system of claim 6, wherein the alarm generated by the alerting unit is selected from the group consisting of a sound, a light, a vibration.

11. The system of claim 6, further comprising a control unit, provided to be used by a user as a control interface for disarming the alarm and adjusting system parameters.

12. The system of claim 6, wherein the image processing/controlling module further comprises:
    an image fetching/decoding unit, coupled to the front imaging unit for converting the traffic lane image into a digital image data;
    a digital signal processing/controlling unit, for analyzing the digital image data received from the image fetching/decoding unit; and
    an image encoding/outputting unit, coupled to the digital signal processing/controlling unit and the displaying unit for receiving a control signal from the digital signal processing/controlling unit and using the control signal for image encoding and thus outputting an output image data to the displaying unit.

13. The system of claim 12, wherein the image processing/controlling module further comprises:
    an image random access memory, for storing the digital image data and a processed image data, wherein the processed image data is outputted from the digital signal processing/controlling unit for providing the digital image data to the digital signal processing/controlling unit for providing the processed image data to the image encoding/outputting unit; and
    a non-volatile programmable memory, for registering an analysis result of traffic lane information received from the digital signal processing/controlling unit.

14. The system of claim 12, wherein the digital signal processing/controlling unit is configured to transmit a traffic lane boundary recognition data and an abnormal driving data to the displaying unit.

15. The system of claim 14, wherein the traffic lane boundary recognition data includes data of vehicle departure, turning orientation, and lane curvature.

16. The system of claim 6, wherein the image processing/controlling module dynamically updates the top boundary predicting relationship curve and the bottom boundary predicting relationship curve.

17. The system of claim 6, wherein the vehicle status is a measurement selected from a group consisting speed, brake signal, turning signal, and the combination thereof.

* * * * *